United States Patent
Whitecar

[11] 3,813,956
[45] June 4, 1974

[54] SPEED CHANGER
[75] Inventor: Alten E. Whitecar, Westville, N.J.
[73] Assignee: Smithkline Corporation, Philadelphia, Pa.
[22] Filed: Mar. 14, 1973
[21] Appl. No.: 341,073

[52] U.S. Cl. .................................. 74/219, 74/217 R
[51] Int. Cl. .......................... F16h 7/00, F16h 9/04
[58] Field of Search .................. 74/219, 217 R, 325

[56] References Cited
UNITED STATES PATENTS
2,948,374  8/1960  Husband .................... 74/217 R X
3,148,556  9/1964  Gibbs et al ........................ 74/325
FOREIGN PATENTS OR APPLICATIONS
490,168  2/1954  Italy Primary Examiner—Leonard H. Gerin
Attorney, Agent, or Firm—Smith, Harding, Earley & Follmer

[57] ABSTRACT

A modular speed changer has an input shaft, an output shaft coaxial with the input shaft and mounted for rotation relative to the input shaft and a rotatable jack shaft parallel to the input and output shafts. The speed changer has a speed changing train comprising a first sprocket secured to the input shaft and a second sprocket secured to the jack shaft with a timing belt connecting said sprockets, a third sprocket secured to the jack shaft, and a fourth sprocket secured to the output shaft with a timing belt connecting these last two mentioned sprockets. The jack shaft is mounted for ready removal to provide for the rapid changing of sprocket ratios.

8 Claims, 5 Drawing Figures

SPEED CHANGER

BACKGROUND OF THE INVENTION

In constructing machines and modifying them for different uses it is frequently desired to have a simple and compact modular speed changer which can be interposed between in-line driving and driven shafts. While the prior art is replete with a wide variety of speed changers, it is believed that the modular speed changer of this invention is novel.

The speed changer of the invention also solves the problem of providing for ready changes of speed ratios in the field by providing for a ready change of sprockets and sprocket shaft distances.

SUMMARY OF THE INVENTION

A speed changer has an input shaft and an output shaft coaxial with the input shaft and mounted for rotation relative to the input shaft and a rotatable jack shaft parallel to the input and output shafts. The speed changer has a speed changing train comprising a first sprocket secured to the input shaft and a second sprocket secured to the jack shaft with a timing belt connecting said sprockets, a third sprocket secured to the jack shaft and a fourth sprocket secured to the output shaft with a timing belt connecting the said third and fourth sprockets. The speed ratio and tooth pitch of the third and fourth sprockets is advantageously the same as in the case of the first and second sprockets in which event each of the two sets of sprockets and a timing belt will provide a speed change equal to the square root of the total speed change desired. Advantageously, the inner end of one of the input and output shafts is mounted within the inner end of the other of said shafts for relative rotation with respect thereto to provide for compactness. Also advantageously, the jack shaft and its associated sprocket are mounted for ready removal and replacement.

It should be noted that here as well as elsewhere in the specification and claims the term sprocket is intended to cover toothed wheels suitable for use with either chains or conventional notched timing belts and that the term timing belt is intended to include both chains and conventional notched timing belts.

DESCRIPTION OF PREFERRED EMBODIMENT

Figure 1:
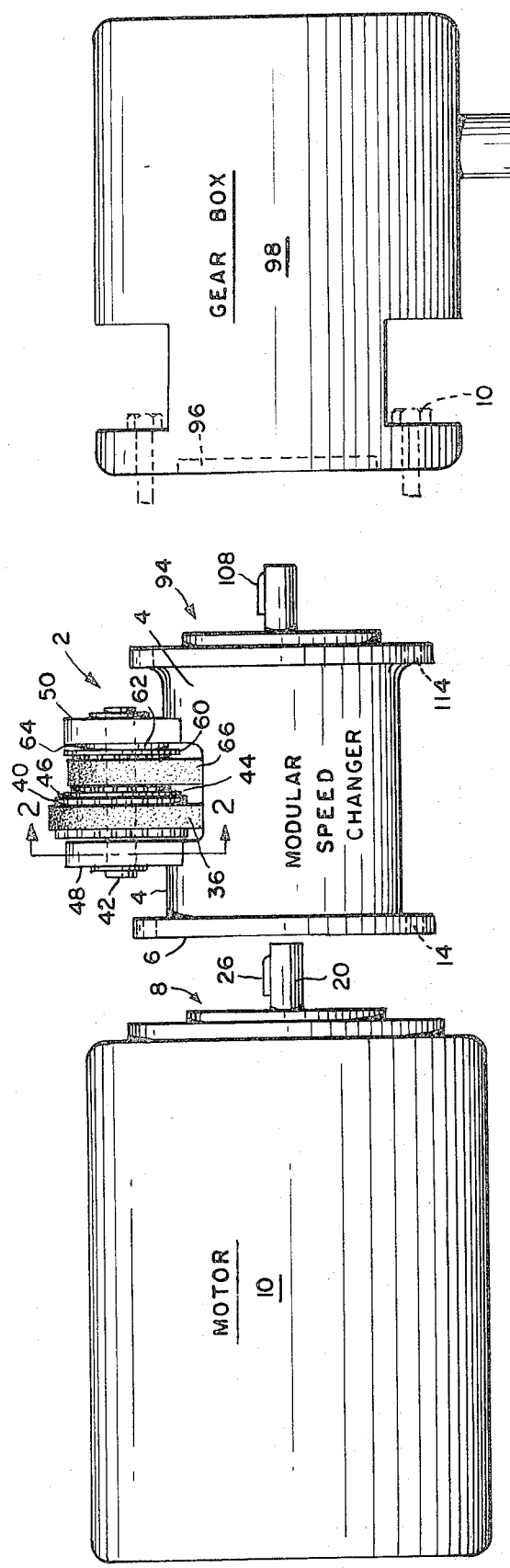
FIG. 1 is a side elevation partially exploded showing a speed changer in accordance with the invention in association with a motor and a gear box.
Figure 2:
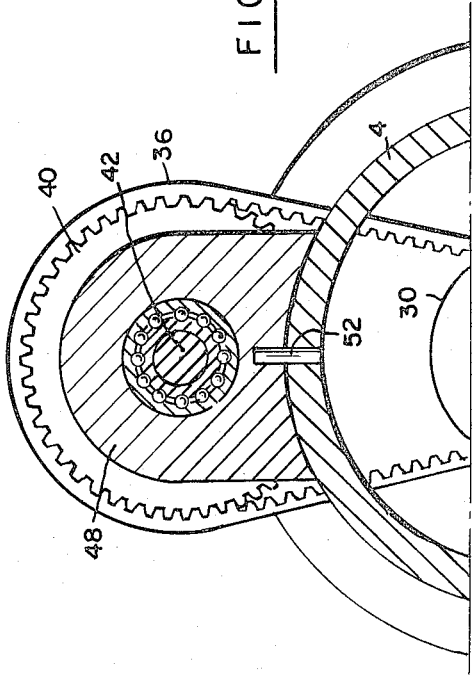
FIG. 2 is a vertical section partially broken away taken on the plane indicated by the line 2—2 in FIG. 1.
Figure 3:
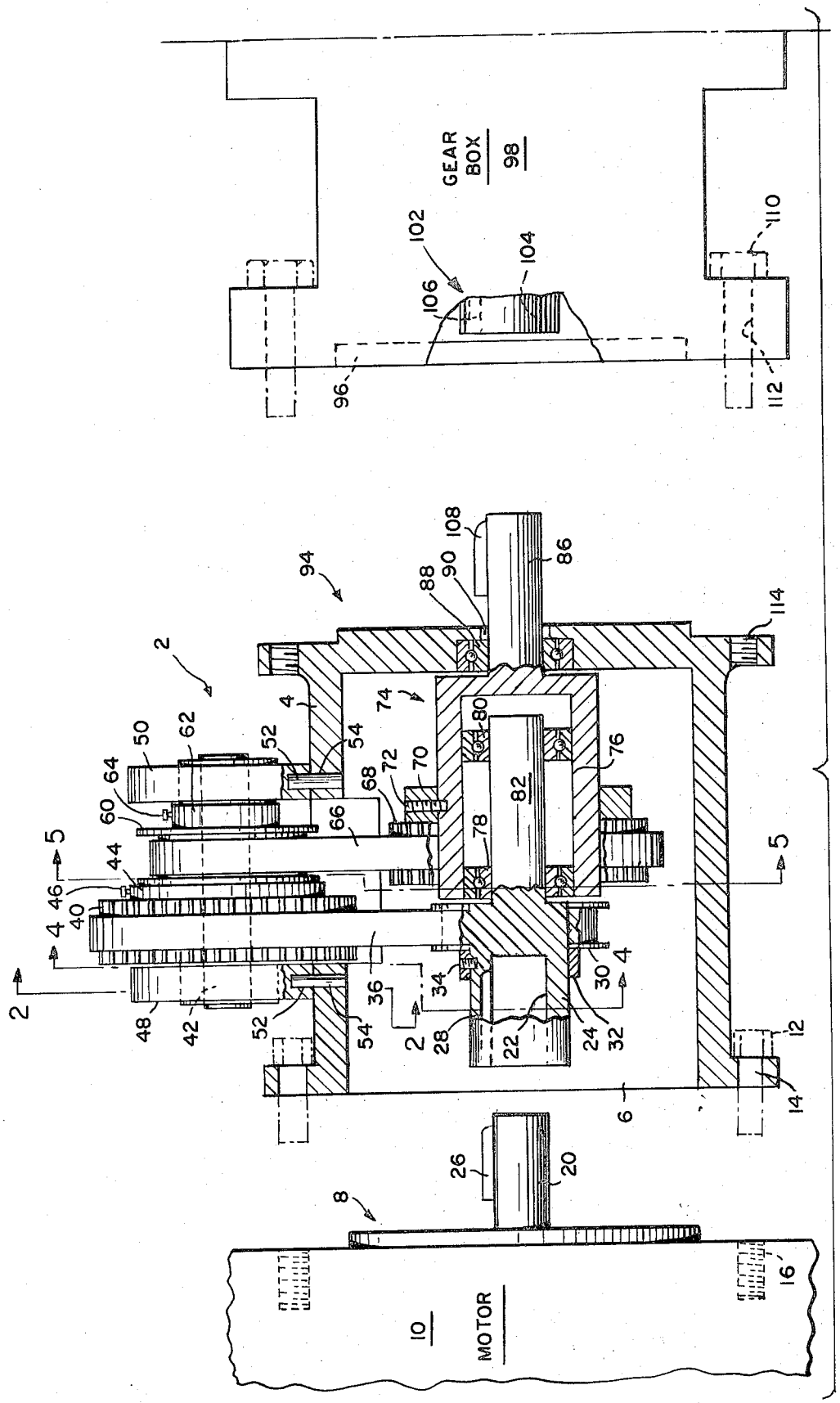
FIG. 3 is an elevation, partially broken away, of the apparatus shown in FIG. 1.
Figure 4:
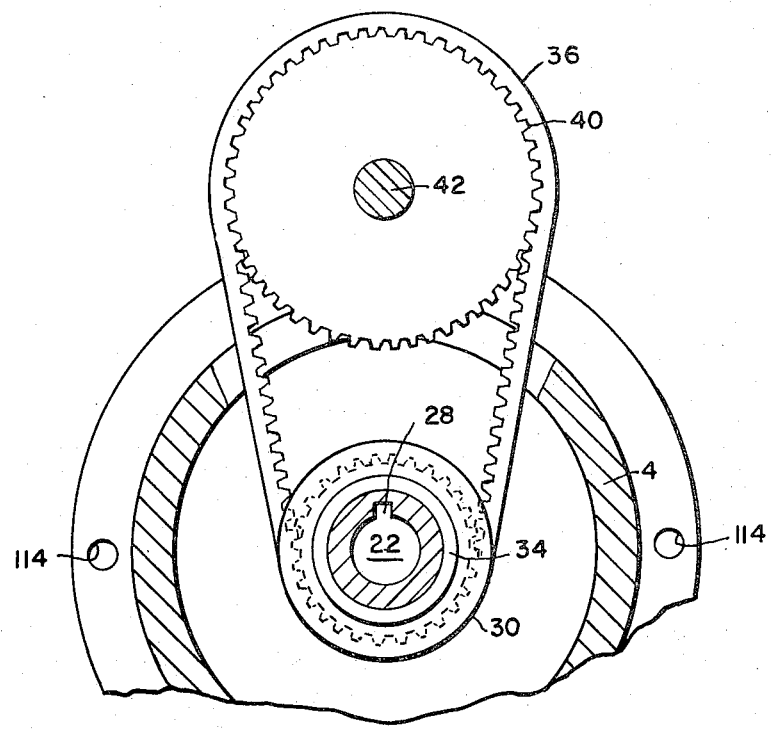
FIG. 4 is a vertical section taken on the plane indicated by the line 4—4 in FIG. 3.
Figure 5:
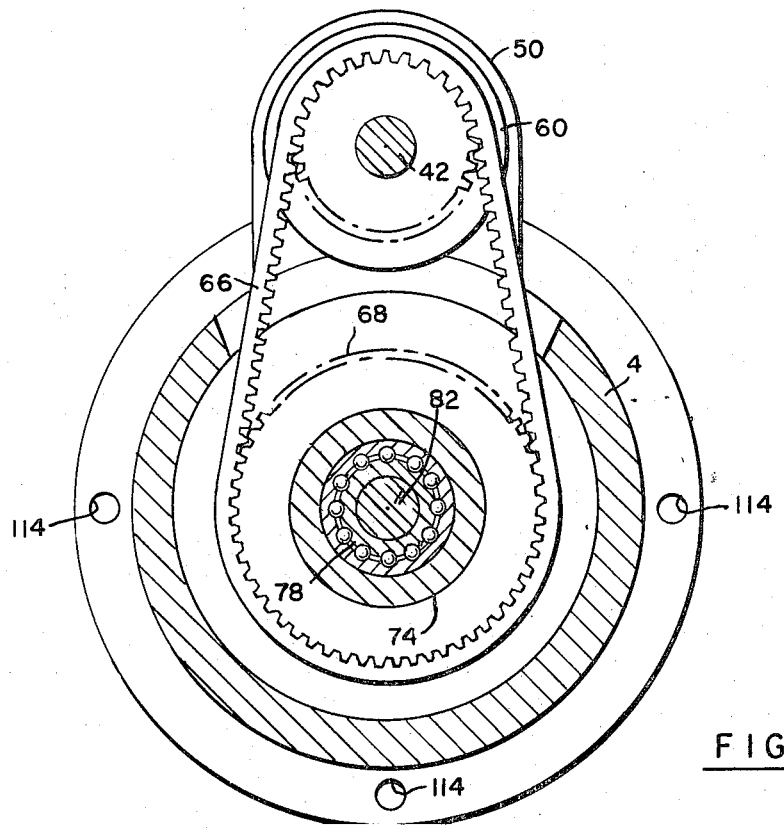
FIG. 5 is a vertical section taken on the plane indicated by the line 5—5 in FIG. 3.

A speed changer 2 in accordance with the invention has a casing 4 with a circular opening 6 at one end for the reception of the typical NEMA C-face 8 of a motor 10. Speed changer 2 is secured to motor 10 by bolts 12 passing through openings 14 and into threaded opening 16 in motor 10. Motor 10 has a drive shaft 20 which is adapted to enter the hollow end 22 of shaft 24 of the speed changer 2. Shaft 20 has a key 26 which is adapted to engage a keyway 28 in shaft 24 to cause shafts 20 and 24 to rotate together.

A flanged timing belt pulley 30 on shaft 24 has a hub 32 which is anchored to shaft 24 by means of a set screw indicated at 34. A timing belt 36 connects timing belt pulley 30 to a timing belt pulley 40 of larger diameter. Pulley 40 is mounted on jack shaft 42 and has a hub 44 which is secured to jack shaft 42 by means of a set screw 46. Jack shaft 42 is mounted for rotation in a pair of standards 48 and 50 each of which has secured thereto by a pressed fit a pin 52 which slideably engages an opening 54 in housing 4. Pins 52 are retained in openings 54 by virtue of the timing belts. A flanged timing belt pulley 60 has a hub 62 which is anchored to jack shaft 42 by means of a set screw 64 and is connected by a timing belt 66 to a timing belt pulley 68 which has a hub 70 secured by a set screw 72 to output shaft 74 of speed changer 2. The pitch of the teeth of all of the timing belt pulleys is the same and the speed ratio of pulleys 30 and 40 is the same as the speed ratio of pulleys 60 and 68 with pulleys 30 and 60 and pulleys 40 and 68 respectively having the same diameters. This provides for an identical center distance for both sets of pulleys. Each set of pulleys provides a speed reduction equal to the square root of the total speed reduction desired.

Shaft 74 has a hollow inner end 76 containing bearings 78 and 80 secured therein by pressed fit. Bearings 78 and 80 receive in a pressed fit a reduced portion 82 of input shaft 24 and provide for the relative rotation of shafts 24 and 74. Shaft 74 has a reduced portion 86 mounted for rotation in a bearing 88 and passing through an opening 90 in casing 4. Casing 4 has a typical NEMA C-face 94 which is adapted to be received in a recess portion 96 of a gear box 98. Gear box 98 has input shaft 102 which has a hollow portion 104 adapted to receive shaft 86 and a keyway 106 for the reception of a key 108 on shaft 86. Speed changer 2 is secured to gear box 98 by bolts 110 passing through openings 112 and secured in threaded opening 114 in face 94 of speed changer 2.

To remove speed changer 2, set screws 46 and 64 are loosened and jack shaft 42 is pulled out clear of standards 48 and 50. Belts 66 and 36 are then removed from pulleys 60 and 40 respectively permitting the removal of these pulleys. Belts 66 and 36 are then removed from pulleys 68 and 30 respectively and withdrawn. Thus pulleys 30, 40, 60 and 68 along with belts 36 and 66 can be replaced readily.

A new speed change is accomplished readily in the field by accommodating the square root of the total desired speed change in each of two substantially identical sets of sprockets and timing belts to achieve the total speed change desired. Thus, if a speed ratio of 1.6 is desired, a speed ratio equal to the square root of 1.6 or 1.2649 is sought for each pulley and timing belt set. Referring to the standard work "Timing Belt Stock Drive Selector" published by Uniroyal Industrial Products, it is seen that this can be accomplished with two sets of pulleys and belts each having a speed ratio 1.27 to give a speed ratio from the input shaft to the output shaft of 1.61 which is sufficiently close for most practical purposes and insures proper tension in both timing belts. Importantly both sets of pulleys may have the same tooth pitch and the same shaft distance so that simple standards such as standards 48 and 50 providing for the jack shaft 42 to be the appropriate distance from the centers of shafts 24 and 74 may be employed.

It will be understood that the foregoing described embodiment is by way of illustration and is not intended to be limiting.

I claim:

1. A modular speed changer comprising:
   a housing having one end adapted to be removably secured to a driving device and the other end adapted to be removably secured to a driven device,
   an input shaft mounted for rotation in said housing,
   an output shaft coaxial with said input shaft and mounted for rotation in said housing independent of said input shaft, and
   a speed changing train comprising:
   a rotatable jack shaft parallel to the input and output shafts,
   a first sprocket secured to the input shaft,
   a second sprocket secured to the jack shaft,
   a first timing belt connecting said sprockets,
   a third sprocket secured to the jack shaft,
   a fourth sprocket secured to the output shaft, and
   a second timing belt connecting the third and fourth sprockets.

2. A speed changer in accordance with claim 1 in which the housing ends have male and female NEMA faces respectively.

3. A speed changer in accordance with claim 1 in which one of the input and output shafts is mounted for rotation in a bearing supported by the casing and the other shaft is supported by a bearing carried by a said one shaft.

4. A speed changer in accordance with claim 3 in which the jack shaft is removable and is mounted on standards removably connected to the casing.

5. A speed changer in accordance with claim 1 in which the tooth pitch of all of the sprockets is the same and the speed ratio of the first and second sprockets is the same as the speed ratio of the third and fourth sprockets.

6. A speed changer in accordance with claim 5 in which the housing ends have male and female NEMA faces respectively.

7. A speed changer in accordance with claim 5 in which one of the input and output shafts is mounted for rotation in a bearing supported by the casing and the other shaft is supported by a bearing carried by a said one shaft.

8. A speed changer in accordance with claim 5 in which the jack shaft is removable and is mounted on standards removably connected to the casing.

* * * * *